: 2,862,945
Patented Dec. 2, 1958

2,862,945
NICKEL CYCLOPENTADIENIDES AND PROCESS FOR PREPARING SAME

Eddie G. Lindstrom and Maurice R. Barusch, Richmond, Calif., assignors to California Research Corporation, San Francisco, Calif., a corporation of Delaware No Drawing. Application January 28, 1953
Serial No. 333,848

5 Claims. (Cl. 260—439)

This invention relates to the preparation and discovery of a new and useful organic nickel compound and specifically to a compound consisting solely of nickel, carbon and hydrogen.

Contrary to the presently accepted postulations regarding the structure of the recently discovered compound iron biscyclopentadienyl, commonly referred to as ferrocene, it has now been found possible to prepare and identify a nickel analogue thereof. This new compound is identified as a nickel cyclopentadienide and specifically nickel biscyclopentadienyl (nickelocene). This nickel compound possesses unique properties which render it of considerable value in a number of practical applications, as, for example, an additive for improving the anti-knock characteristics of fuels for spark ignition internal combustion engines and a wear-reducing additive for diesel fuels.

This nickel cyclopentadienide exists as a deep green crystalline solid with a melting point of 143° C. The compound sublimes at an appreciable rate at temperatures above about 70° C., is relatively insoluble in water but readily soluble in most organic solvents to give green solutions. Characteristic of this compound is the apparent instability in certain solvents with ultimate decomposition or change in chemical form to yield yellowish-brown precipitates. This behavior has been observed in the more polar solvents such as acetone, ethyl ether and ethyl alcohol, whereas the compound remains comparatively stable in the inert non-polar solvents such as the hydrocarbon solvents and particularly the petroleum fractions as the mixed hexanes. While this nickel cyclopentadienide is relatively insoluble in water, it is nevertheless unstable in contact with water and yields a yellowish-brown gelatinous precipitate.

The nickel cyclopentadienides of this invention include, besides the preferred nickel biscyclopentadienyl, the derivatives thereof containing aliphatic substituents attached to one or more of the cyclopentadiene nuclei. These novel compounds may be prepared in substantial yields by a number of reactions as, for example, by metathesis of an alkali or alkaline earth metal cyclopentadienide with an inorganic nickel salt such as the chloride, and preferably in the presence of liquid ammonia or by a Grignard reaction of cyclopentadienyl magnesium bromide with anhydrous nickelous chloride in the presence of an inert non-polar solvent followed by rapid removal of solvent under vacuum.

In place of cyclopentadiene, its aliphatic substituted derivatives, and particularly the mono- or polyalkyl derivatives, may be employed as the initial reaction charge. As illustrative of the alkyl derivatives, which may be substituted for cyclopentadiene in these preparation processes, are the following: Methyl cyclopentadienes, 3,4-dimethyl-1,3-cyclopentadiene, 1-methyl-3-ethyl-1,3-cyclopentadiene, 1,3,5-trimethyl-1,3-cyclopentadiene, 1-methyl-3-isopropyl-1,3-cyclopentadiene, 3-methyl-1-isopropyl-1,3-cyclopentadiene, 3-methyl-4-propyl-1,3-cyclopentadiene, and 1,5-dimethyl-4-isopropyl-1,3-cyclopentadiene.

The preferred reaction process in the preparation of a nickel cyclopentadienide and particularly nickel biscyclopentadienyl is the metathesis reaction in the presence of liquid ammonia. In this reaction the alkali or alkaline earth metal cyclopentadienide is prepared by reacting cyclopentadiene or its aliphatic substituted derivatives with an alkali or alkaline earth metal or the corresponding amide in liquid ammonia. After formation of the particular metal cyclopentadienide, the product is maintained in the liquid ammonia medium and contacted with an anhydrous nickel salt to form a reaction product comprising the desired nickel cyclopentadienide. The product may be worked up in a number of ways to recover the crystalline nickel cyclopentadienide, as by evaporation of the ammonia and sublimation of the nickel compound from the reaction product or, alternatively, employing an inert non-polar solvent immiscible with liquid ammonia during the reaction and separating the resulting solution of nickel cyclopentadienide from the reaction system.

The following example of the preparation of nickel biscyclopentadienyl is presented as a specific illustration of the foregoing reaction processes and is not to be construed as a limitation thereof.

EXAMPLE 11.5 grams (0.5 gram atom) of sodium metal was added to about 300 cc. of liquid ammonia containing 0.2 gram ferric nitrate nonahydrate as a catalyst in a half liter reaction flask equipped with a reflux condenser and means for agitation. The resulting sodium amide was allowed to remain in the reaction flask together with the excess ammonia and maintained at reduced temperature with a solid carbon dioxide-acetone coolant in the condenser and surrounding the flask. 33 grams (0.5 gram mol) of freshly-prepared (from the commercially available dimer) cyclopentadiene, which had been kept at solid carbon dioxide temperatures, were then added dropwise to the sodium amide-liquid ammonia mixture at such a rate as not to exceed the capacity of the condenser cooled with the solid carbon dioxide-acetone coolant. There was considerable heat evolution and ammonia disengagement, and the sodium amide-ammonia slurry changed color from gray to green. The formation of sodium cyclopentadienide was indicated by the disappearance of the slightly-soluble sodium amide. In a separate operation, commercially available $NiCl_2 \cdot 6H_2O$ was dehydrated by heating under vacuum (5 mm. absolute) to about 160° C. for a sufficient time to disengage the theoretical quantity of water. 32 grams (about 0.25 gram mol) of the granular nickelous chloride ($NiCl_2$) were then added to the solid carbon dioxide-acetone cooled reaction flask containing the sodium cyclopentadienide in liquid ammonia through a powder funnel over about a 10 minute period. Considerable heat evolution was observed during the addition.

The mixture was stirred for two hours at approximately −33° C. and thereafter the coolant was removed and the ammonia allowed to evaporate off over night, with suitable precautions to prevent the entrance of air into the system by providing a double bubbler containing mineral oil between the condenser outlet and the vent system. 110 grams of residue consisting of sodium chloride, nickel biscyclopentadienyl, together with residual ammonia and side reaction products, was obtained. An aliquot of the residue was extracted five times with 200 cc. portions of straight-run petroleum-mixed hexanes. The filtered hexane solution was evaporated to dryness at a final pressure of 5 mm. absolute. The distillate had a pale green color indicating a small loss of product. The residue from the hexane extraction was then sublimed under 2 mm. absolute pressure at the temperature of boiling water on to an ice-cooled cold finger in the vapor phase. The resulting yields of deep green sublimed crystals, when prorated to the original nickelous chloride charge, corresponded to the yield of about 37 weight percent of theoretical. An analysis of the product for carbon, hydrogen and nickel, gave the following results:

|  | Theoretical, weight percent | Found, weight percent | |
|---|---|---|---|
| Carbon | 63.56 | 63.60 | 63.71 |
| Hydrogen | 5.34 | 5.24 | 5.39 |
| Nickel | 31.10 | 30.31 | 30.21 |
| Total | 100.00 | 99.15 | 99.31 |

The molecular weight was determined on a mass spectrometer and resulted in two parent peaks corresponding to 188 and 190, representative of the compounds containing the two nickel isotopes, as against a theoretical value of 188.8 for the compound $NiC_{10}H_{10}$.

This compound was subjected to further analytical tests including X-ray and infra-red absorption tests. The X-ray powder diffraction pattern of the nickel biscyclopentadienyl resulted in the following characteristic interplanar spacings or lines.

| Line No. | Spacing in Angstroms | Relative intensity |
|---|---|---|
| 1 | 6.0 | Very strong. |
| 2 | 5.1 | Do. |
| 3 | 4.8 | Strong. |
| 4 | 4.2 | Medium. |
| 5 | 3.94 | Do. |
| 6 | 3.62 | Do. |
| 7 | 3.32 | Do. |
| 8 | 3.10 | Do. |
| 9 | 2.96 | Weak. |
| 10 | 2.72 | Do. |
| 11 | 2.66 | Do. |
| 12 | 2.52 | Do. |
| 13 | 2.44 | Do. |
| 14 | 2.38 | Do. |
| 15 | 2.30 | Do. |
| 16 | 2.20 | Do. |
| 17 | 2.12 | Do. |
| 18 | 2.07 | Do. |
| 19 | 2.03 | Do. |
| 20 | 1.98 | Do. |
| 21 | 1.92 | Do. |
| 22 | 1.83 | Do. |
| 23 | 1.78 | Do. |
| 24 | 1.74 | Do. |
| 25 | 1.67 | Do. |
| 26 | 1.64 | Do. |
| 27 | 1.58 | Do. |
| 28 | 1.541 | Do. |
| 29 | 1.499 | Do. |
| 30 | 1.439 | Do. |

The foregoing diffraction pattern is substantially identical with that of iron biscyclopentadienyl as to conclude substantially identical crystal structures.

The compound was also subjected to infra-red absorption analysis which was conducted in a rock salt cell with solutions of the compound in carbon tetrachloride and in carbon disulfide. The adsorption peaks observed were as follows:

*Wave length in microns*

| | |
|---|---|
| 12.90 | 8.95 |
| 9.90 | 6.97 |
| 9.50 | 3.2 |

These absorption data are again substantially identical with the values obtained on iron biscyclopentadienyl.

Obviously, many modifications and variations of the invention as hereinbefore set forth may be made without departing from the spirit and scope thereof, and only such limitations should be imposed as are indicated in the appended claims.

We claim:

1. A process for the preparation of a nickel cyclopentadienide which comprises reacting a metal cyclopentadienide of the class consisting of alkali and alkaline earth metals with an anhydrous nickel salt in the presence of liquid ammonia.

2. A process for the preparation of a nickel cyclopentadiene which comprises reacting an alkali metal reactant with an organic reactant of the class consisting of cyclopentadiene and its aliphatic substituents in the presence of liquid ammonia to form an alkali metal cyclopentadienide and thereafter reacting said alkali metal cyclopentadienide with an anhydrous nickel salt in the presence of liquid ammonia.

3. A process for the preparation of nickel biscyclopentadienyl which comprises reacting an alkali metal cyclopentadienide with an anhydrous nickelous salt in the presence of liquid ammonia.

4. A process for the preparation of a nickel cyclopentadienide which comprises reacting sodium cyclopentadienide with an anhydrous nickel salt in the presence of liquid ammonia.

5. A process for the preparation of nickel biscyclopentadienyl which comprises reacting sodium cyclopentadienide with anhydrous nickelous chloride in the presence of liquid ammonia.

References Cited in the file of this patent

UNITED STATES PATENTS

| 2,680,756 | Pauson | June 8, 1954 |
| 2,680,758 | Thomas | June 8, 1954 |

OTHER REFERENCES

Fischer et al.: Zeitschrift für Naturforschung, Band 7b, Heft 7, pp. 377–79, July 1952.

Wilkinson: J. A. C. S., vol. 74, p. 6148.